US011287398B2

(12) United States Patent
Heuer et al.

(10) Patent No.: US 11,287,398 B2
(45) Date of Patent: Mar. 29, 2022

(54) EDDY CURRENT SENSOR FOR NON-DESTRUCTIVE TESTING OF A SUBSTRATE

(71) Applicant: Fraunhofer-Gesellschaft zur Förderung der angewandten Forschung e.V., Munich (DE)

(72) Inventors: Henning Heuer, Dresden (DE); Martin Schulze, Dresden (DE); Iben Khaldoun Lefkaier, Laghouat (DZ); Mohammed Naïdjate, Laghouat (DZ); Bachir Helifa, Laghouat (DZ); Feliachi Mouloud, Saint-Nazaire (FR)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 48 days.

(21) Appl. No.: 16/686,470

(22) Filed: Nov. 18, 2019

(65) Prior Publication Data
US 2020/0088685 A1    Mar. 19, 2020

Related U.S. Application Data

(63) Continuation of application No. PCT/EP2018/063214, filed on May 18, 2018.

(30) Foreign Application Priority Data

May 24, 2017 (DE) .................... 10 2017 208 874.5

(51) Int. Cl.
   *G01D 5/20* (2006.01)
   *G01N 27/90* (2021.01)
   *G01N 27/9013* (2021.01)

(52) U.S. Cl.
   CPC ....... *G01N 27/9006* (2013.01); *G01D 5/2053* (2013.01); *G01N 27/902* (2013.01); *G01N 27/9046* (2013.01)

(58) Field of Classification Search
   None
   See application file for complete search history.

(56) References Cited

U.S. PATENT DOCUMENTS

| 2003/0151402 A1 | 8/2003 | Kindler |
| 2008/0189968 A1* | 8/2008 | Schletti ........... G01B 7/107 33/501.4 |
| 2009/0091318 A1* | 4/2009 | Lepage .......... G01N 27/9013 324/242 |

FOREIGN PATENT DOCUMENTS

| DE | 102006031139 A1 | 1/2008 |
| JP | S60141549 U | 9/1985 |

(Continued)

OTHER PUBLICATIONS

R. Grimberg, A. Savin, R. Steigmann, A. Bruma: Eddy Current Examination of Carbon Fibres in Carbon-Epoxy Composites and Kevlar, The 8th International Conference of the Slovenian Society for Non-Destructive Testing, Sep. 1-3, 2005, Portorož, Slovenia.

(Continued)

*Primary Examiner* — Jas A Sanghera
(74) *Attorney, Agent, or Firm* — McClure, Qualey & Rodack, LLP

(57) ABSTRACT

The invention relates to an eddy current sensor element for non-destructive testing of a substrate, having an assembly of at least a first and a second flat coil, wherein the first flat coil and the second flat coil each have a triangular shape with a first to third coil edge, wherein one of the edges of the first flat coil and one of the edges of the second flat coil are arranged adjacent and parallel to each other, and wherein the assembly has a quadrangular shape. The invention further (Continued)

relates to an eddy current sensor for the non-destructive testing of a substrate, having a plurality of the eddy current sensor elements.

19 Claims, 11 Drawing Sheets

(56) References Cited

FOREIGN PATENT DOCUMENTS

| JP | H0829396 A | 3/1988 |
| JP | 2011013181 A | 1/2011 |
| JP | 2014153325 A | 8/2014 |

OTHER PUBLICATIONS

Helifa B. (2012): Contribution à la simulation du CND par courants de Foucault en vue de la caractérisation des fissures débouchantes. Thèse en sciences et technologies de l'information et de mathématiques, Université de Nantes.

Menana H. (2009): Non destructive evaluation of the conductivity tensor of CFRP plate using a rotating eddy current sensor, XIV International Symposium on Electromagnetic Fields. ISEF 2009, Arras—France.

Mook G. (2001): Non-destructive characterization of carbon-fiber reinforced plastics by means of eddy currents. Composites Science and Technology No. 61, p. 865-873.

Cyril Ravat: Conception de multicapteurs à courants de Foucault et inversion des signaux associés pour le contrôle non destructive, Instrumentation and Detectors. Université Paris Sud—Paris XI, 2008. French.

Adriana Savin, R. Grimberg, S. Chifan: Evaluation of delamination in Carbon Fibre Composites Using the Eddy Current Method, 15th WCNDT, Roma 2000.

* cited by examiner

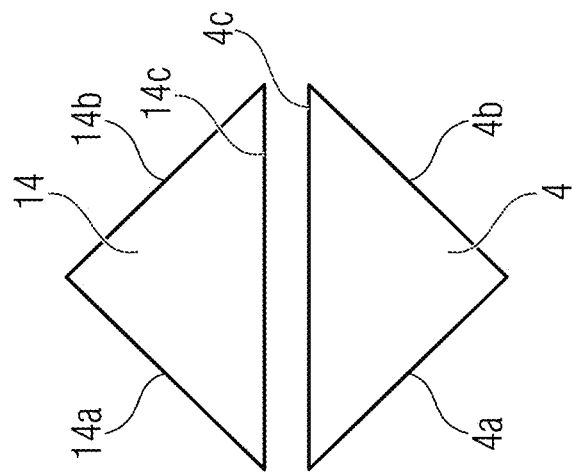
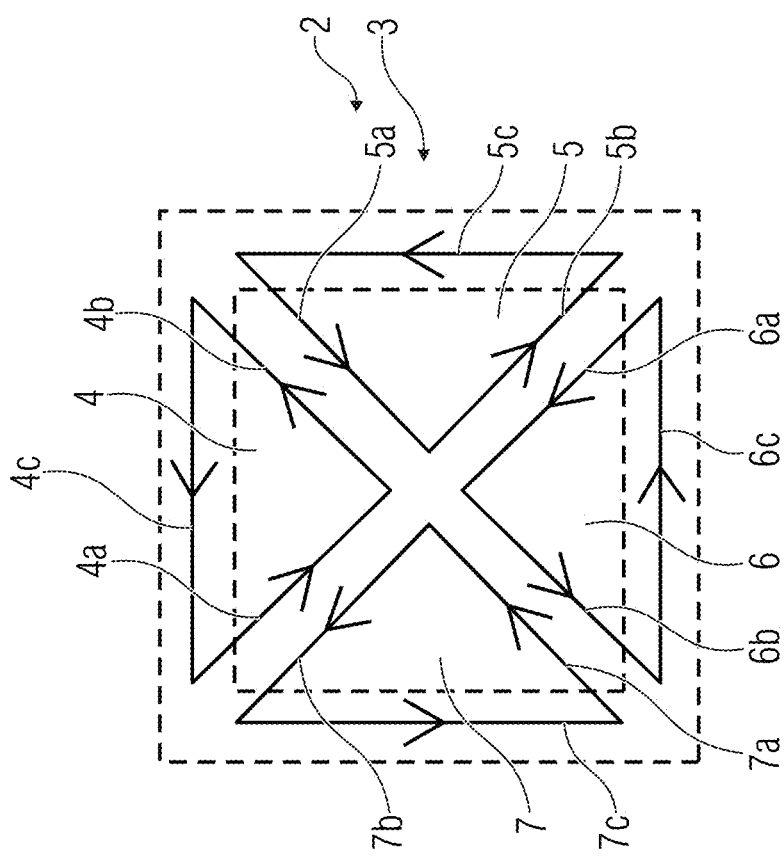

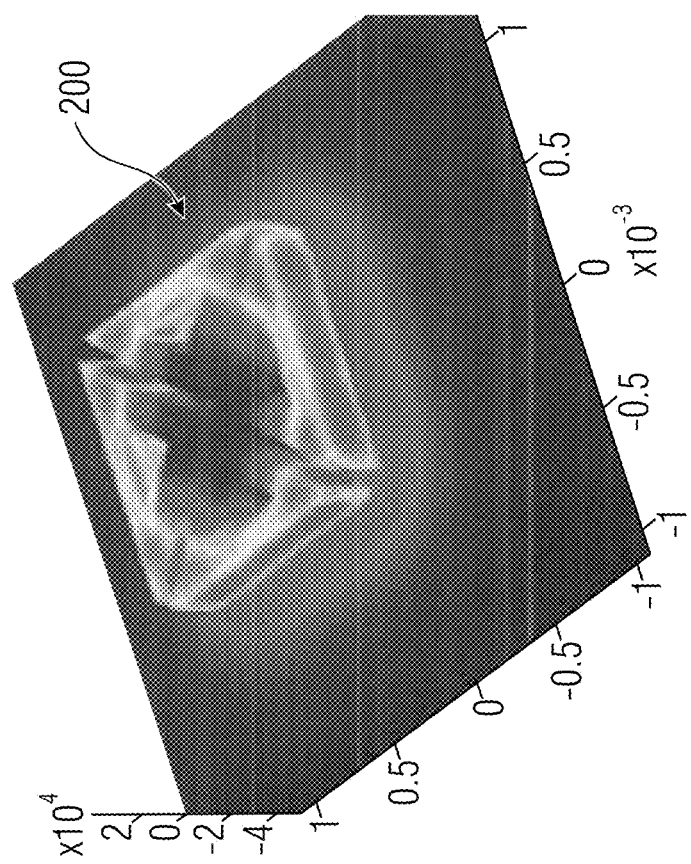
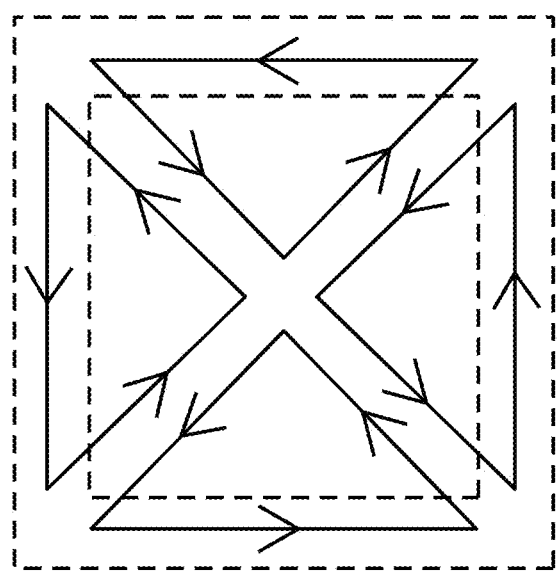
Fig. 4

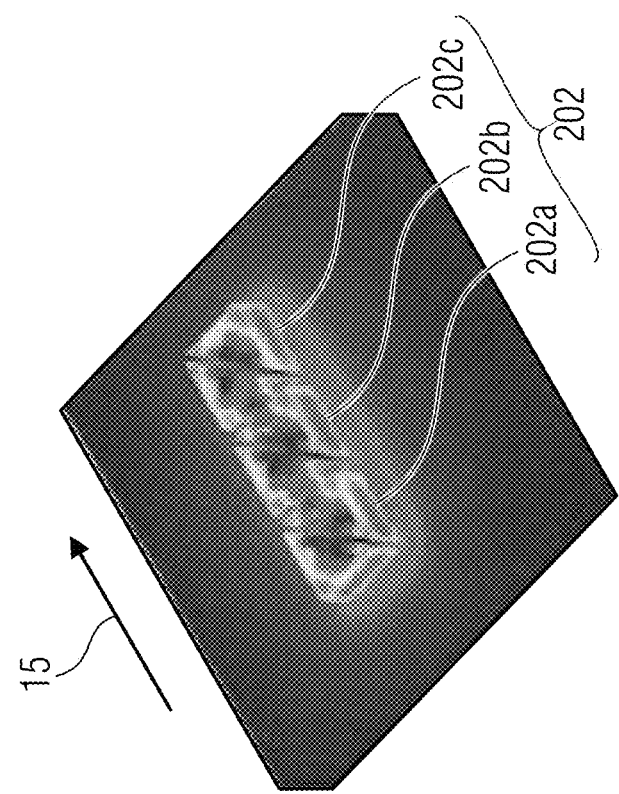
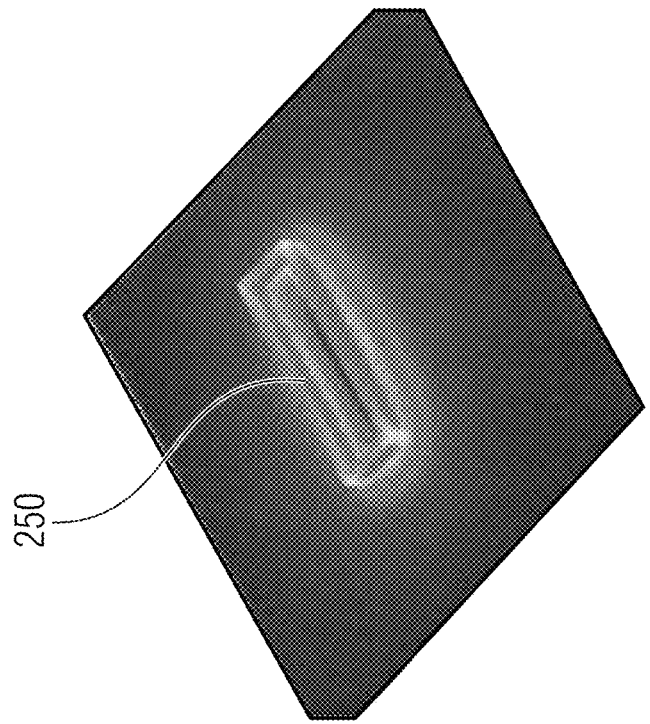
Fig. 5 ent. Moreover, the
EDDY CURRENT SENSOR FOR NON-DESTRUCTIVE TESTING OF A SUBSTRATE

CROSS-REFERENCES TO RELATED APPLICATIONS

This application is a continuation of copending International Application No. PCT/EP2018/063214, filed May 18, 2018, which is incorporated herein by reference in its entirety, and additionally claims priority from German Application No. DE 10 2017 208 874.5, filed May 24, 2017, which is incorporated herein by reference in its entirety.

BACKGROUND OF THE INVENTION

The invention relates to an eddy current sensor for the non-destructive testing of a substrate, in particular for the testing of a layered substrate made up of plies reinforced by fibers having a preferential direction. Furthermore, the invention relates to a method of operating an eddy current sensor wherein the eddy current sensor comprises a plurality of eddy current sensor elements, as well as a method of operating such a eddy current sensor element. Moreover, the invention relates to a use of an assembly comprising at least a first and a second coil, wherein the assembly has a quadrangular shape, as a sensor for a non-destructive testing of a substrate.

For the non-destructive testing of materials the use of eddy current sensors is well established. In general terms, an eddy current sensor comprises a flat coil which is arranged in close proximity to the surface of the material to be tested. When a signal, e. g. an alternating voltage, is applied to the contacts at the end of the wire forming the coil, the sensor coil is excited and an alternating electromagnetic field is generated which penetrates into the material to be probed. The alternating electromagnetic field induces in the material eddy currents which themselves are sensed by the coil as a change in the impedance. The surface area which is tested is given by the contour of the coil to which the signal is applied.

The use of an eddy current sensor is particularly known for the testing of layered materials, such as laminates, in particular for the testing of plies made up of carbon fiber reinforced polymer (CFRP) layers. In this context, an eddy current sensor, which has usually a rectangular shape, is used to study the number as well as the orientation of plies. The relative orientation of the plies is deduced from the orientation of the carbon fibers which reinforce each ply.

Using an eddy current sensor with a coil of a rectangular shape, the study of a larger portion of the surface of the CRFP needs to shift the coil with respect to the surface under inspection. Furthermore, in order to gain an information on the orientation of the carbon fibers within each ply, the coil has to be rotated parallel to the surface under study. The mechanical rotation involves the intervention of an operator, which reduces the precision of the measurement. Providing an automatic system for moving, in particular for rotating, the eddy current sensor relative to the surface under study, renders the system expensive. In addition to the inaccuracy of a human operator and the costs of an automatic system for shifting the eddy current sensor relative to the surface, both alternatives are disadvantageous in terms of an execution time for the non-destructive testing (NDT).

To date, the mechanical rotation of the eddy current sensors has been seemed to be without an alternative when probing a material for a direction information, in particular when testing a material like a laminate made up of plies of CFRP.

SUMMARY

According to an embodiment, an eddy current sensor element for non-destructive testing of a substrate may have: an assembly of at least a first and a second flat coil, wherein the first flat coil and the second flat coil each has a triangular shape with a first to third coil edge, wherein one of the edges of the first flat coil and one of the edges of the second flat coil are arranged adjacent and parallel to each other, and wherein the assembly has a quadrangular shape.

According to another embodiment, a method for operating an inventive eddy current sensor element may have the steps of: (a) exciting the eddy current sensor element by simultaneously applying a signal to each of the first and the second coil, such that the edge of the first flat coil and the edge of the second flat coil being arranged adjacent and parallel to each other are traversed by currents in antiparallel directions.

According to another embodiment, an eddy current sensor for non-destructive testing of a substrate may have: a plurality of the eddy current sensor elements according to the above embodiment, wherein the eddy current sensor elements are arranged, in a quadrangular order, adjacent and parallel to each other, such that any two adjacent sensor elements have two parallel edges.

According to another embodiment, a method for operating an eddy current sensor may have the steps of: (a) providing an inventive eddy current sensor, and performing the steps (b) and (c) for a first eddy current sensor element and subsequently for a second eddy current sensor element: (b) exciting the eddy current sensor elements by simultaneously applying a signal to each of the first and the second coil, such that the current traversing the inner edge of the first coil is antiparallel the current traversing the inner edge of the second coil, and (c) sensing the response of the excited substrate by detecting a change in impedance of the coils of the respective excited current sensor element.

According to another embodiment, a method for operating an eddy current sensor may have the steps of: (a) providing an inventive eddy current sensor, (b) exciting the eddy current sensor by simultaneously and jointly exciting each of the at least two eddy current sensor elements, with the second eddy current sensor element being adjacent to the first eddy current sensor element, by simultaneously applying a signal to each of the first and the second coil of each of the eddy current sensor elements causing the current traversing an outer edge of the first eddy current sensor element to be antiparallel to a current traversing an outer edge of a second eddy current sensor element adjacent to the first eddy current sensor element.

Another embodiment may have the use of an assembly having at least a first coil and a second coil, wherein the assembly has a quadrangular shape, and wherein the assembly further has the inventive features, as a sensor for a non-destructive testing of a substrate.

According to the invention, this object is accomplished by an eddy current sensor with the features above, in particular by an eddy current sensor for non-destructive testing of a substrate, comprising a plurality of the eddy current sensor elements according to one of the above embodiments, wherein the eddy current sensor elements are arranged, in a quadrangular order, adjacent and parallel to each other, such that any two adjacent sensor elements have two parallel edges.

The eddy current sensor according to the invention enables a first operation mode according to a method, namely a method for operating an eddy current sensor, comprising the steps of:
  (a) providing an eddy current sensor according to one of the embodiments, and performing the steps (b) and (c) for a first eddy current sensor element and subsequently for a second eddy current sensor element:
  (b) exciting the eddy current sensor elements by simultaneously applying a signal to each of the first and the second coil, such that the current traversing the inner edge of the first coil is antiparallel the current traversing the inner edge of the second coil, and
  (c) sensing the response of the excited substrate by detecting a change in impedance of the coils of the respective excited current sensor element.

The eddy current sensor according to the invention enables a second operation mode according to a method, namely a method for operating an eddy current sensor, comprising the steps of:
  a. providing an eddy current sensor according to one of the above embodiments,
  b. exciting the eddy current sensor by simultaneously and jointly exciting each of the at least two eddy current sensor elements by simultaneously applying a signal to each of the first and the second coil of each of the eddy current sensor elements causing the current traversing an outer edge of the first eddy current sensor element to be antiparallel to a current traversing an outer edge of a second eddy current sensor element adjacent to the first eddy current sensor element.

As regards the eddy current sensor elements, the invention envisages a current sensor element for non-destructive testing of a substrate, comprising an assembly of at least a first and a second flat coil, wherein the first flat coil and the second flat coil each have a triangular shape with a first to third coil edge, wherein one of the edges of the first flat coil and one of the edges of the second flat coil are arranged adjacent and parallel to each other, and wherein the assembly has a quadrangular shape.

The invention further encompasses the use of an assembly comprising at least a first and a second coil, wherein the assembly has a quadrangular shape, and wherein the assembly further has the features of any one of the embodiments, as a sensor for a non-destructive testing of a substrate.

As still regards the eddy current sensor element, the invention further envisages a method for operating the eddy current sensor element, the method comprising the step of exciting the eddy current sensor element by simultaneously applying a signal to each of the first and the second coil, such that the edge of the first flat coil and the edge of the second flat coil being arranged adjacent and parallel to each other are traversed by currents in antiparallel directions.

The invention is based on the observation that, providing two parallel electrically conductive wires, when the first wire is traversed with an electrical current of a first direction and the second wire is traversed with an appropriately chosen electrical current in a direction antiparallel to the first direction, the resulting electromagnetic fields of the two oppositely traversed wires will superpose so that they may cancel each other, to the effect that the resultant electromagnetic field vanishes to a large extent around the two parallel wires.

As for a single eddy current sensor element, when according to the method for operating this single eddy current element this single eddy current element is excited by simultaneously applying a signal (e. g. an alternating voltage) to the first coil and to the second coil, respectively, such that the edge of the first flat coil and the edge of the second flat coil are arranged adjacent and parallel, these two edges can be traversed by currents in antiparallel directions. In particular, it may be enabled that at the two parallel edges the electromagnetic fields of the two currents may superpose such that the resultant electromagnetic field nearly vanishes. In effect, the electromagnetic field of the excited single eddy current element is that of the remaining sides of the at least two triangular shaped coils, i. e. that of an effective coil having the quadrangular shape of the eddy current sensor element.

In an embodiment, for the eddy current sensor element it is envisaged that the assembly has a rectangular shape. In particular, in an embodiment for the eddy current sensor it is envisaged that the assembly has a square shape.

In an embodiment each of the at least two flat coils of the eddy current sensor element has the shape of an isosceles triangle.

For the eddy current sensor element, in an embodiment each of the coils has the shape of a right-angled triangle.

For the eddy current sensor element, in an embodiment it is envisaged that the assembly comprises two flat coils.

In particular, it is envisaged for an eddy current sensor element comprising exactly two flat coils each of which having the shape of a right-angled triangle, the two flat coils are arranged such that the hypothenuse-edges of the first coil and of the second coil are parallel.

In an alternative embodiment, it is envisaged that the assembly comprises four flat coils such that for any one of the coils, a first edge of this coil is parallel to an edge of a first adjacent coil, and a second edge of this coil is parallel to an edge of a second adjacent coil.

For the eddy current sensor element it is envisaged in an embodiment that the at least one coil with the triangular shape, in particular all flat coils of the assembly, are designed for an operating frequency of 0.8 to 2 MHz, in particular of approximately 1 MHz.

For the eddy current sensor element it an advantage if all of the flat coils of the assembly are congruent to each other. As a consequence, the dimensional characteristics as well as the electrical characteristics of all the flat coils are roughly the same.

As regards the method for operating the eddy current sensor element, in an advantageous way to perform the method it is envisaged to perform the step of 'sensing the response of the excited substrate by detecting a change in impedance in the flat coils of the eddy current sensor element' to complete the measurement of the response of the coil having the effective quadrangular shape of the eddy current sensor element.

As regards the sensor element, the at least two eddy current sensor elements are arranged, in a quadrangular order, adjacent and parallel to each other, such that any two adjacent sensor elements have two parallel edges. This arrangement allows a first operation mode by performing the steps (b) and (c) subsequently for two different eddy current sensor elements to gain a spatially highly resolved information at two different sites of the surface under study. In particular, the position of the two excited eddy current sensor elements may be randomly chosen to enable a first and rough inspection of the substrate under study for defects or flaws.

In an advantageous way to perform the method for operating the eddy current sensor, it is envisaged that the two eddy current sensor elements which are subsequently excited be adjacent to each other, such that the second eddy current sensor element is adjacent to the first current element in order to enable a scanning of the surface under study in the direction in which the two adjacent eddy current sensor elements extend.

As regards the sensor element, the at least two eddy current sensor elements are arranged, in a quadrangular order, adjacent and parallel to each other, such that any two adjacent sensor elements have two parallel edges. This arrangement allows a second operation mode according to the method summarized above by simultaneously applying a signal to each of the two coils of each of the two adjacent eddy current sensor elements which causes the current traversing the outer edge of the first eddy current sensor element to be antiparallel to a current traversing the outer edge of a second eddy current sensor element. The antiparallel currents in the outer edges of the adjacent eddy current sensor elements causes the respective electromagnetic fields to superpose such that the resultant electromagnetic field nearly vanishes. As a consequence, the two adjacent eddy current sensor elements when excited simultaneously with an appropriate signal, i. e. with an appropriately chosen alternating voltage, have a sensing area which is roughly the sum of the areas of the two adjacent eddy current sensor elements. Since the two adjacent eddy current sensor elements may extend along a specific direction, by exciting the two adjacent eddy current sensor elements jointly and simultaneously a directional information can be gained. In particular, if both of the first and the second eddy current sensor elements being adjacent to each other are excited jointly and simultaneously, the resultant effective sensor equals a single coil of rectangular shape with the longer edges being twice as long as the shorter edges. Of course, it can be envisaged to excite three or more pairwise adjoining eddy current sensor elements at the same time to get an effective sensor having a larger probing area. If the three or more eddy current sensor elements are arranged in a specific direction, e. g. in a horizontal, a vertical or a diagonal direction in a plane, a specific information as to an advantageous orientation within the area of the surface under study can be gained.

As regards the method, in an advantageous way to perform the method it is envisaged to sense the response of the excited substrate by detecting a change in impedance of the eddy current sensor elements.

As regards the eddy current sensor, in an embodiment it is envisaged that the eddy current sensor elements form an array of columns and rows. By selectively addressing adjacent eddy current sensor elements an advantageous directional information along the columns, along the rows and along a diagonal between the columns and the rows can be obtained.

In an embodiment, the eddy current sensor further comprises a control unit which is configured to simultaneously apply a signal to the coils of a sub-group of the coils, wherein the sub-group comprises at least one of the eddy current sensor element. If the sub-group comprises a single eddy current sensor element, the control unit enables to operate the eddy current sensor according to a method, i. e. in the first operation mode described above, which further entails a scanning of the surface under study with a high spatial resolution. If the sub-group comprises at least two eddy current sensor elements being adjacent to each other along at least one pair of outer edges, the control unit enables to operate the eddy current sensor according to the method, i. e. in the second operation mode described above such that the effective sensed area has an advantageous direction and allows to detect a directional information of the surfaced which is tested. In short, the control unit which is in the advantageous embodiment part of the eddy current sensor allows to perform operation modes and enables to switch between the operation modes.

In an embodiment, the eddy current sensor comprises a control unit which is configured such that adjacent inner edges of the flat coils of a sub-group are provided with currents in antiparallel direction.

In an embodiment, the eddy current sensor comprises the control unit which is configured such that the collective outer edge of the flat coils of a sub-group is provided with a current in a collective circumferential direction.

In an embodiment, the eddy current sensor comprises the control unit which is further configured to subsequently apply a signal to a first sub-group and to a second subgroup, wherein the two sub-groups are extending along different directions.

Furthermore, in an embodiment, it is envisaged that the control unit of the eddy current sensor is further configured to sense the response of the substrate by detecting a change in impedance of the coils to which the signal has been applied.

BRIEF DESCRIPTION OF THE DRAWINGS

Embodiments of the present invention will be detailed subsequently referring to the appended drawings, in which:

FIG. 1a is a schematic plan view of an embodiment of an eddy current sensor element according to the invention, FIG. 1b is a schematic plan view of another embodiment of an eddy current sensor element according to the invention, FIG. 4 shows a reproduction of FIG. 1a to demonstrate the current flow upon jointly exciting the four coils of the eddy current sensor element 2 of FIG. 1a (left) and shows a perspective view of the two-dimensional distribution of the magnetic potential vector upon jointly exciting the four coils of the eddy current sensor element 2 (right), FIG. 5 shows a perspective view of the two-dimensional distribution of a magnetic field vector calculated for a system of a rectangular coil (a, left) and of a sub-group of the proposed multi-element sensor the sub-group comprising three adjacent eddy current sensor elements as depicted in FIG. 1a arranged in a row (b, right)

DETAILED DESCRIPTION OF THE INVENTION

Figure 2:
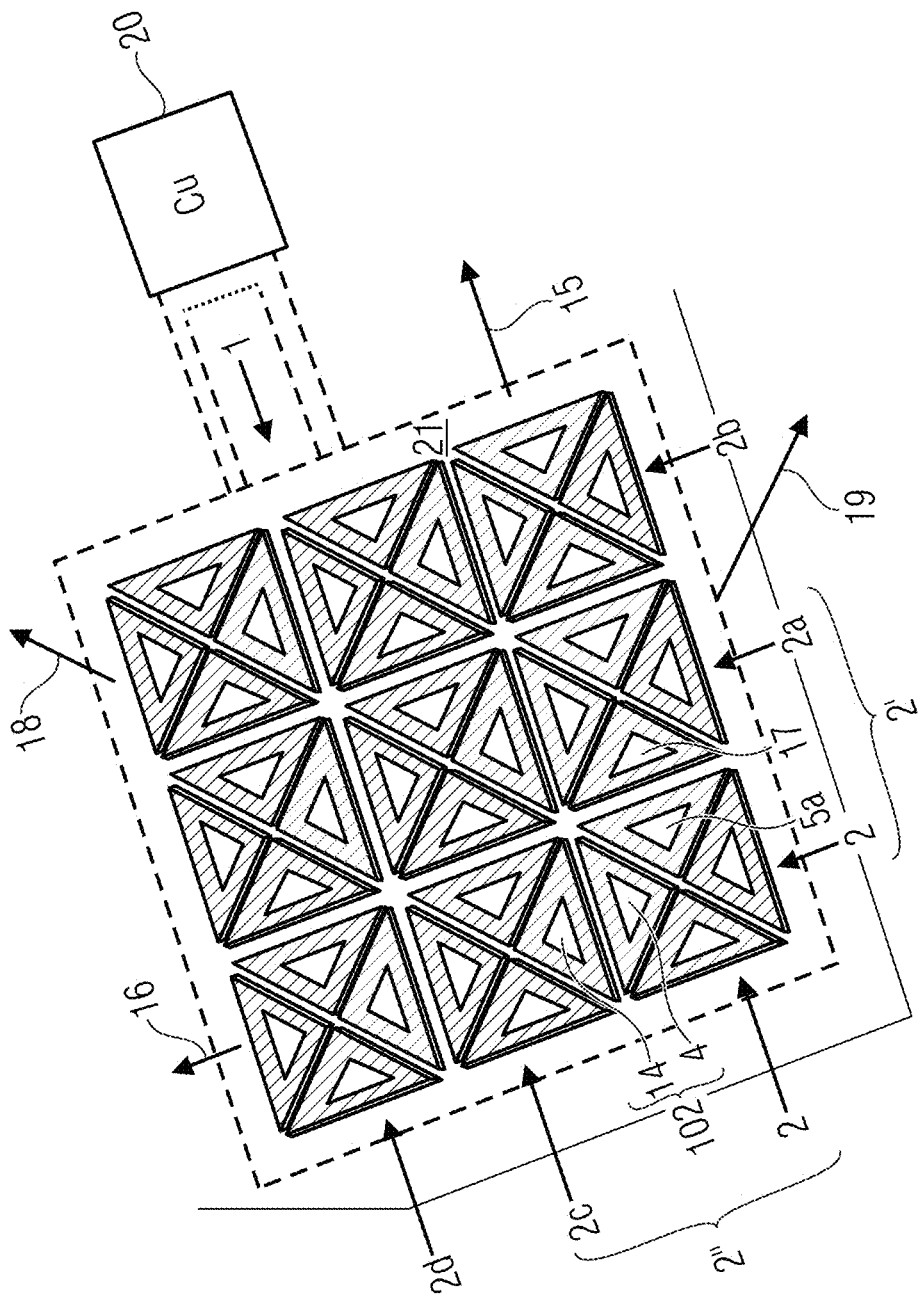
FIG. 2 is a perspective schematic view of an embodiment of an eddy current sensor according to the invention, incorporating the eddy current sensor elements of FIG. 1a and FIG. 1b.

FIG. 2 shows an exemplary embodiment of an eddy current sensor 1 for a non-destructive testing (NDT) of a substrate, in particular for the NDT of a laminated substrate comprising four plies of carbon fiber reinforced plastic (CFRP).

The eddy current sensor comprises an assembly of flat coils, in particular an rectangular assembly of 36 flat coils which are arranged in a fixed manner on a rigid substrate layer 21. As can be seen, the eddy current sensor 1 comprises a plurality of at least three, in particular nine, eddy current sensor elements.

In FIG. 2, one of the eddy current elements is designated by the reference numeral '2' and is depicted in more detail in FIG. 1a.

FIG. 1a shows the eddy current sensor element 2 in a schematic fashion. As can be seen, the eddy current sensor element 2 comprises an assembly 3 of at least a first flat coil 4 and a second flat coil 5. In fact, the assembly 3 further comprises a third flat coil 6 and a fourth flat coil 7. As can be seen, the first and the second flat coil 4, 5 have each a triangular shape. Furthermore, the assembly 3 has an overall quadrangular, in particular a rectangular, and specifically a square shape.

All of the four flat coils 4, 5, 6, 7 of the assembly 3 are congruent to each other which means that the dimensional sizes as well as the electric characteristics of the four coils 4, 5, 6, 7 are equal. In the following, only the first flat coil 4 is described in more detail.

Figure 3:
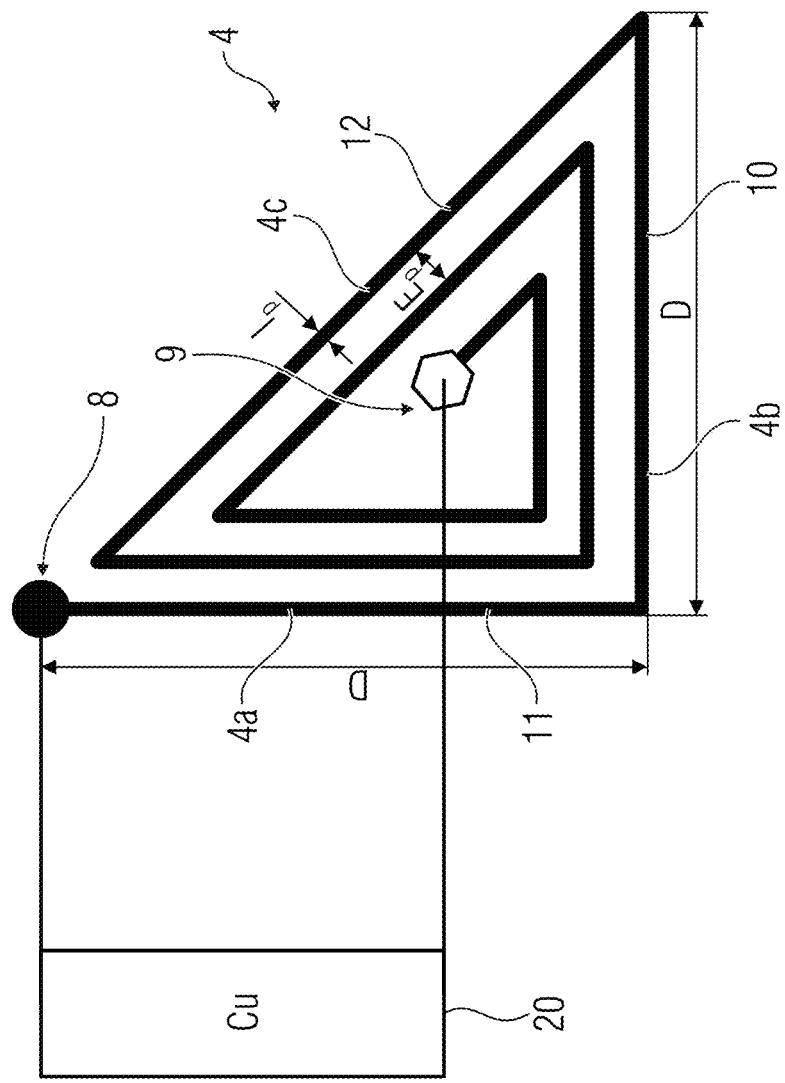
FIG. 3 is a schematic plan view of a detail of FIG. 1a and 1b.

FIG. 3 shows the first flat coil 4 with the triangular shape. As can be seen, the flat coil 4 has the shape of an isosceles triangle, with a length 'D' for both of the sceles of the tringle. Furthermore, the flat coil 4 has the shape of a right-angled triangle, with an angle of 90° where the two sceles meet. The third edge opposite the right angle is termed the 'hypotenuse-edge' of the triangle.

The flat coil 4 is formed by an electrically conductive wire material deposited on a substrate layer. The wire material forms the flat coil 4 with an external length D of the two sceles of approx. 1 mm, a line width $l_p$ of approx. 6 μm, an inter-line space of approx. 3 mm and a number of turns n of 33. The depicted triangular-shaped flat coil 4 is designed for an operating frequency of 0.8 MHz to 2.0 MHz, in particular of approximately 1 MHz.

The first flat coil 4 has two contact points 8, 9 such that a signal, in particular an alternating voltage, can be applied to the flat coil 4. Once an signal, in particular the alternating voltage, is applied to the contact points 8, 9, the flat coil 4 is excited and an alternating current traverses the wire material of the flat coil 4 causing an alternating electromagnetic field to surround the edges of the flat coil 4. The alternating electromagnetic field induces in the substrate under study eddy currents which in turn change the impedance of the flat coil 4. This change in impedance can be sensed in order to gain an information on the substrate under study.

As a consequence, the flat coil 4 can act as an eddy current sensor unit. The application of an operating frequency of approximately 1 MHz has the effect that non-excited adjacent coils, which are 'at rest' with respect to the excited coils, do not influence the measuring result to a significant extent (below, with reference to FIG. 7).

The outer contour of the conductor forming the coil 4 renders the coil 4 a triangular shape. In particular, the coil 4 has the shape of an isosceles triangle, with two edges 10, 11 (the 'sceles') of the triangle having the same length D. As can further be seen, the flat coil 4 has the shape of a right-angled triangle, since the angle between the sceles 10, 11 is approx. 90°. The third edge of the triangle opposite the right angle is called hypotenuse-edge or base 12.

As can be seen in FIG. 1a, the eddy current sensor element 2 comprises four coils 4, 5, 6, 7 each of which having the triangular shape described in more detail in FIG. 3 with reference to the first flat coil 4. The four flat coils 4 to 7 are arranged so that the vertices of each triangle, where the respective right angle is formed, meet at the center of the square, such that the contour of the square is formed by the hypotenuse-edges 4c, 5c, 6c, 7c or bases of each of the triangular coils 4, 5, 6 and 7. In particular, the assembly 3 comprises the four flat coils 4, 5, 6, 7 such that for any one of the coils, a first edge of this coil is parallel to an edge of a first adjacent coil, and a second edge of this coil is parallel to an edge of a second adjacent coil. Starting with the first flat coil 4, a first edge 4a of the first flat coil 4 is parallel to an edge 7b of the fourth coil 7 adjacent to the first coil 4, and a second edge 4b is parallel to an edge 5a of the second coil 5 which is adjacent to the first coil 4. In a similar fashion, starting with the third flat coil 6, a first edge 6a of the third coil 6 is parallel to an edge 5b of the second coil 5 adjacent to the third coil 6, and a second edge 6b is parallel to an edge 7a of the fourth coil 7 adjacent to the third coil 6. In particular, the second edge 4b of the first flat coil 4 is arranged adjacent and parallel to the first edge 5a of the second flat coil 5.

The assembly 3 of the four coils 4, 5, 6, 7 of the eddy current sensor element 2 can be viewed to be so arranged such that four pairs of mutually parallel edges are formed, namely the edges 4a, 7b between the fourth and the first coil 7, 4, the edges 4b, 5a between the first and the second coil 4, 5, the edges 5b, 6a between the second and the third coil 5, 6, and the edges 6b, 7a between the third and the fourth coil 6, 7. The edges 4a, 4b, 5a, 5b, 6a, 6b, 7a, 7b can be viewed as 'inner' edges since they do not contribute to the overall quadrangular, in particular rectangular, more precisely square shape of the assembly 3. In fact, the square shape of the assembly 3 is due to the hypotenuse-edges 4c, 5c, 6c and 7c of the respective triangular-shaped flat coils 4, 5, 6, 7.

The eddy current sensor element 2 as depicted in FIG. 1a enables to perform a method for operating this eddy current sensor element 2, wherein the method comprises the step of exciting this eddy current element 2 by simultaneously applying a signal, in particular an alternating voltage, to the first coil 4 and to the second coil 5, such that the edge 4b of the first flat coil 4 and the edge 5a of the second flat coil 5, which are arranged adjacent and parallel to each other, are traversed by currents in antiparallel directions. In particular, since the coils 4 and 5 are congruent to each other, it is enabled to apply a voltage of equal polarity and roughly the same absolute value to each of the coils 4 and 5 simultaneously with the effect that the electromagnetic fields along the adjacent and parallel edges 4b, 5a tend to superpose such that the resultant electromagnetic field vanishes to a significant, in particular a maximum extend. As a result, the surface area which is probed would be that of a coil the contour of which would be delimited by the sceles 5b and 4a of the coils 4 and 5 as well as the outer edges 4c, 5c.

In particular, starting from the eddy current sensor element 2 as depicted in FIG. 1a, it is enabled to perform the method for operating this eddy current sensor element 2 so as to excite the entire eddy current sensor element 2 by applying simultaneously a signal to each of the coils 4, 5, 6 and 7 such that the resultant electromagnetic fields along the four pairs of mutually parallel adjacent inner edges 7b, 4a and 4b, 5a and 5b, 6a as well as 6b, 7a vanishes to a maximum extent having the effect that the resultant electromagnetic field of the eddy current sensor element 2 is given by the outer edges of the contour of the eddy current sensor element 2, i. e. by the four hypotenuse-edges 4c, 5c, 6c and 7c. As a result, the excited eddy current sensor element 2 has the effect of a square-shaped coil. To achieve this result, a signal, in particular an alternating voltage of equal polarity and roughly the same absolute value has to be applied simultaneously to each of the coils 4, 5, 6 and 7, which causes the currents in adjacent coils to traverse the coil in the same (in FIG. 1a: counter-clockwise) direction.

Once having excited the eddy current sensor element 2 as described above, the measuring process is completed by sensing the response of the excited substrate by detecting a change in impedance in the flat coils 4, 5, 6, 7 of the eddy current sensor element 2.

FIG. 1a shows the as-described eddy current sensor element 2 comprises four coils 4, 5, 6, 7 and which can be referred to as a 'four coil eddy current sensor element'. Furthermore, FIG. 1b shows a second kind of a sensor element 102 which comprises two flat coils and which can be referred to as a 'two coil eddy current sensor element'. As can be seen in FIG. 1, the first coil 4 is adjacent to a second coil 14.

FIG. 1b shows an eddy current sensor element 102 for the non-destructive testing of a substrate, comprising an assembly 103 of two flat coils 4, 14, wherein the first flat coil 4 and the second flat coil 14 each have a triangular shape with a first to third coil edge 4a, 4b, 4c, 14a, 14b, 14c. The second coil 14 is congruent to the first coil 4 which was described in detail with respect to FIG. 3 above, in particular, the second coil 14 has the shape of a right-angled isosceles triangle.

As can be seen in FIG. 1b, the hypotenuse edge 4c of the first coil 4 is arranged adjacent and parallel to the hypotenuse edge 14c of the second coil 14 such that the assembly 103 has a quadrangular, in particular a rectangular, more precisely a square shape. In particular, the two flat coils 4, 14 are such arranged that the hypotenuse edges 4c, 14c of the first coil 4 and of the second coil 14 are parallel. With respect to the square-shaped contour of the eddy current sensor element 102, the hypotenuse edges 4c, 14c are to be regarded as inner edges since they do not contribute to the shape. Rather, the square shape of the eddy current sensor element 102 is delimited by the outer edges 14a, 14b and 4a, 4b of the triangle-shaped flat coils 4, 14.

Regarding the method for operating the eddy current sensor element 102, in an advantageous way for performing the method, for exciting the eddy current sensor element 102 a signal, in particular an alternating voltage, is applied to each of the first flat coil 4 and to the second flat coil 14 such that the edge 4c of the first flat coil 4 and the edge 14c of the second flat coil 14 which are arranged adjacent and parallel to each other are traversed by currents in antiparallel directions. In particular, when applying a first voltage to the first flat coil 4 and a second voltage to the second flat coil 14, when the voltages have the same absolute value and the same polarities, the resulting electromagnetic field at the parallel and adjacent edges 4c, 14c vanishes to a maximum extent. Again, to achieve this result, the signal, in particular the alternating voltage of equal polarity and about the same absolute value has to be applied simultaneously to each of the coils 4, 14, which causes the currents in the two adjacent coils to traverse the coil in the same (in FIG. 1b:clockwise) direction.

The measuring process is completed by performing the step 'sensing the response of the excited substrate by detecting a change in impedance in the flat coils 4, 14 of the eddy current sensor element 102'.

FIG. 2 shows two different types of square-shaped eddy current sensor elements, namely a first type comprising four coils, as described above with reference to FIG. 1a, and referred to above as 'four coil eddy current sensor element', and a second type, comprising two coils, as described above with reference to FIG. 1b, and referred to above as 'two coil eddy current sensor element'.

In the following, the term 'four coil ECSE' refers to the first type of the eddy current sensor element, and the term 'two coil ECSE' to the second type of the eddy current sensor.

FIG. 2 shows that the eddy current sensor 1 for the non-destructive testing of a substrate comprises a plurality, i. e. more than three, eddy current sensor elements 2, 102, wherein the eddy current sensor elements 2, 102 are arranged in a quadrangular, in particular a rectangular, order adjacent and parallel to each other.

In particular, referring to the four coil ECSE indicated with the reference numeral 2, to the right a second four coil ECSE 2a can be seen as well as a third four coil ECSE 2b. In particular, along a horizontal direction (arrow 15), the four coil ECSE 2a is adjacent to both, the four coil ECSE 2 and the four coil ECSE 2b.

Likewise, in a vertical direction (arrow 16), a four coil ECSE 2c is adjacent to the four coil ECSE 2 and to the four coil ECSE 2d.

As can be seen, any two adjacent sensor elements 2, 2a, 2b, 2c, 2d have two parallel edges. As for the case of the two four coil ECSE 2, 2a, the edge 5a (FIG. 1a) is adjacent and parallel to an edge 17 of a triangular shaped coil being part of the four coil ECSE 2a.

Likewise, as can be seen in FIG. 2, the two coil ECSE 102 is adjacent to another two coil ECSE at the upper right and to still another two coil ECSE at the lower right.

For the case of both types of eddy current sensor elements 2, 102, it can be seen that this element has a parallel edge to the adjacent eddy current sensor element of the same type. In particular, any two adjacent sensor elements of the same type have two parallel edges.

As can be further seen in FIG. 2, the eddy current sensor elements 2, 102 form an array of columns and rows. In particular, for the four coil ECSE 5, 5a, 5b, 5c, 5d, the columns and rows extend along the horizontal and the vertical direction given by the arrows 15, 16. For the two coils ECSE, the columns and rows extend along a direction at an angle of +45° with respect to the arrow 15 and along a direction at an angle of −45° with respect to the arrow 15, respectively (arrows 18, 19).

With further reference to FIG. 2, an advantageous way of performing the method of operating the eddy current sensor 1 may be exemplified as follows:

Starting with the eddy current sensor 1 as depicted in FIG. 2 having the two four coil ECSE 2, 2a adjacent to each other extending along the horizontal direction along the arrow 15, as a first step (b) the left ECSE 2 is excited by simultaneously applying a signal to each of the four coils such that current traversing the inner edge of the first coil is antiparallel the current traversing the inner edge of the second coil. As explained above, with reference to FIG. 1a, the electromagnetic fields at the inner edges 4a, 7b, 4b, 5a, 5b, 6y, 6b, 7a superpose such that the respective resultant electromagnetic field is that of a square-shaped coil having the contour delimited by the edges 4c, 5c, 6c and 7c. In the second step (c) the response of the excited substrate by detecting a change in impedance of the coils 4, 5, 6, 7 of the excited eddy current sensor element 2 is sensed. Next, the right ECSE 2a is excited as described above with the step (b), and finally the response of the four coils of the right ECSE 2a is sensed, as described above. In effect, the surface area under the ECSE 2, 2a has been subsequently sensed, i. e. two adjacent portions of the surface area have been scanned in the direction of the arrow 15 without a relative movement of the eddy current sensor 1 with respect to the surface under study.

Likewise, by subsequently exciting and sensing the ECSE 2 and 2c, a scanning of the surface under study with respect to the direction of the arrow 16 can be accomplished.

In a similar fashion, starting from the two-coil ECSE 102, a scanning in the direction of the arrows 18 and 19 can be accomplished, respectively.

In effect, without moving the eddy current sensor 1 relative to the surface it is possible to scan the surface in more than three directions independently. This scanning was referred to above as the first mode of operation of the eddy current sensor 1.

Still referring to FIG. 2, an advantageous way of operating the eddy current sensor 1 according a second operating mode may be exemplified as follows:

Starting with the eddy current sensor 1 as depicted in FIG. 2 having two four coil ECSE 2, 2a adjacent to each other extending along the horizontal direction as indicated by the arrow 15, by simultaneously and jointly exciting each of the two eddy current sensor elements 2, 2a by simultaneously applying a signal to each of the first and the second coil of each of the eddy current sensor elements causing the current traversing an outer edge 5a (FIG. 2) of the first eddy current sensor element 2 to be antiparallel to a current traversing an outer edge 17 of a second eddy current sensor element 2a adjacent to the first eddy current sensor element 2. As a result, the simultaneously and jointly excited adjacent eddy current elements 2, 2a have the effect of a single rectangular eddy current sensor 2' extending in direction of the arrow 15 twice as long as in the perpendicular direction (arrow 16). Such an effective rectangular sensor is specifically designed for signals having a preferential orientation along or parallel to the horizontal direction of the arrow 15.

Likewise, the first four coil ECSE 2 could be simultaneously and jointly excited with the adjacent four coil ECSE 2c to have the effect of a single rectangular eddy current sensor 2" extending along the vertical direction, as given by the arrow 16.

In a similar fashion, more than two eddy current sensor elements extending in one direction could be simultaneously and jointly excited.

Furthermore, starting from the two coil ECSE 102, this eddy current sensor element together with at least one adjacent two coil ECSE can be simultaneously and jointly be excited to sense the surface under study for defects with a preferential orientation along one of the arrows 18 and 19, respectively.

In order to perform the operating modes described above, the eddy current sensor 1 may comprise a control unit 20 which is configured to simultaneously apply a signal, in particular an alternating voltage, to the coils of a sub-group of the coils, wherein the sub-group comprises at least one of the eddy current sensor elements 2, 102. The control unit 20 is depicted in FIG. 2 and in FIG. 3 and has a conductive wire contacting each of the two contacts 8, 9 of each of the coils, as illustrated for the coil 4 in FIG. 3. As a consequence, the control unit 20 can addresses each of the 36 coils of the eddy current sensor 1 individually or may address a specific sub-group of the coils collectively, in order to apply a signal, in particular an alternating voltage, to the selected subgroups of the coils or the selected coil, respectively.

If the sub-group of the coils corresponds to exactly one of the eddy current sensor elements 2, 102, the control unit 20 may be configured to scan the eddy current sensor element 2, 102 along the surface under study by subsequently exciting adjacent eddy current sensor elements along one of the directions according to the arrows 18, 19 15 and 16, i. e. according to an angle of 0°, 90°, +45° and −45°.

If the sub-group of the coils corresponds to two or more of the eddy current sensor elements 2, 102, by simultaneously and jointly applying a signal to two adjacent eddy current sensor elements, an effective sensor 2', 2" can be emulated having an advantageous sensitivity to defects in one of the directions 18, 19, 15 and 16.

In any instance, the control unit 20 may provide adjacent inner edges of the flat coils of the sub-group with currents in antiparallel directions. This was explained in more detail with respect to the FIG. 1a, 1b for the eddy current sensor elements 2, 102. Furthermore, with reference to FIG. 2, the effective sensor 2' is constituted by the adjacent eddy current sensor elements 2, 2a. The control unit 20 applies a signal to the coils of the eddy current sensor elements 2, 2a such that for each of the current sensor elements 2, 2a, a current in an antiparallel direction is provided. Furthermore, since the parallel edges 5a, 17 define an inner edge with respect to the effective sensor 2', at these parallel edges 5, 17 currents in an antiparallel or opposite direction are provided. As a consequence, the collective outer edge of the flat coils of the sub-group 2', in particular the outer contour which tightly envelopes both the eddy current sensor elements 2, 2a of the sub-group 2', is provided with an effective current which can be envisaged to traverse in a collective circumferential direction along the outer contour of the sub-group 2'.

The control unit 20 may further be configured to subsequently apply a signal to a first sub-group and to a second sub-group, wherein the two sub-groups extend along different direction. In particular, the first sub-group may be the sub-group 2' (FIG. 2) and the second sub-group may be the sub-group 2", with each of the sub-groups 2', 2" comprising two four coil eddy current sensor elements but extending in perpendicular directions. In particular, the control unit may enable to switch the eddy current sensor 1 with respect to a direction-dependent sensitivity.

The control unit 20 may be further configured to shift the at least one sub-group in at least two direction. If the sub-group is constituted by one single eddy current sensor element 2, 102, this corresponds to the scanning mode operation described above. If the sub-group is constituted by at least two different eddy current sensor elements, e. g. the effective sensor 2' (FIG. 2), this shifting may be accomplished by first simultaneously and jointly exciting the eddy current elements 2, 2a (to gain the effective sensor 2') and then to simultaneously and jointly exciting the eddy current elements 2a, 2b in order to provide a shift to the right, along the horizontal direction of the arrow 15. In a similar fashion, the effective sensor 2' may be shifted along the vertical direction, along the direction of the arrow 16.

Furthermore, the control unit 20 may be further configured to sense the response of the substrate by detecting a change in impedance of the coils to which the signal has been applied.

The non-destructive testing of a substrate using eddy currents is based on the distribution and circulation of induced currents in an electrically conductive component of the substrate which is studied. The distribution of the induced eddy currents is closely dependent on the profile of the electromagnetic field of excitement.

FIG. 4 shows in the left part a block of four right-angled isosceles triangle shaped coils which form a square shaped block. This block corresponds to the eddy current sensor element 2 that was described above with reference to FIG. 1a.

Based on the idea that the electromagnetic fields generated by two parallel wires traversed by currents of the same amplitude, but in opposite or antiparallel directions, cancel each other, the four triangular coils of the left part of FIG. 4 can be excited in such a way that the resulting electromagnetic field is similar to that of a square coil. The fields generated by currents flowing in the diagonal conductor portions are of the same amplitude, but opposite in sign, and hence superpose such as to cancel each other. As a result, the remaining field is that due to the currents flowing in the external conductor portions. This is shown in FIG. 4, left part, and was explained in more detail above, with reference to FIG. 1a. Consequently, as FIG. 4, right part shows, the calculated distribution 200 of the magnetic potential vector of the eddy current sensor element 2 comprising the four triangular-shaped coils 4, 5, 6, 7 is to a reasonable extent equivalent to that of a square-shaped coil having the same contour. The as-described block corresponds to the four coil eddy current sensor element 2 as described above with reference to FIG. 1a. In the following, when referring to a block, a four coil eddy current sensor element 2 as described above with reference to FIG. 1a is meant.

Starting with the right part of FIG. 5, a sub-group 202 comprising three square-shaped eddy current sensor elements 202a, 202b, 202c (each comprising a group of four triangular coils, as in FIG. 1a explained with respect to the eddy current sensor element 2) can be simultaneously and jointly excited by the application of a signal to each of the eddy current sensor elements 202a, 202b, 202c of the sub-group 202, to have the effective electromagnetic field of a rectangular coil having the same contour as that of the sub-group 202. As can be seen, by simultaneously and jointly exciting each two adjacent eddy current sensor elements (e. g. the adjacent eddy current sensor element 202a, 202b) by simultaneously applying a signal, in particular an alternating voltage, to each of four coils of each of the eddy current sensor elements 202a, 202b causes the current traversing an outer (e. g. right) edge of the first eddy current sensor element 202a to be opposite in direction and antiparallel to a current traversing an outer (for this example: left) edge of the second eddy current sensor element 202b adjacent to the first eddy current sensor element 202a. If the alternating voltages have the same magnitude, the generated electromagnetic fields along the opposing, parallel edges where the two eddy current sensor elements 202a, 202b adjoin will superpose such as to cancel to a large extent. In a similar fashion, at the opposing parallel outer edges where the eddy current sensor element 202b, 202c adjoin, the electromagnetic fields may be caused to cancel each other.

As FIG. 5 shows, the magnetic potential vector calculated for a single rectangular coil 250 (FIG. 5, left) is comparable to the magnetic vector potential for the sub-group 202 comprising the three eddy current sensor elements 202a, 202b 202c arranged adjacent to each other in a row along the horizontal direction (arrow 15, FIG. 2) when the sensor elements 202a, 202b, 202c are simultaneously and jointly excited by the application of a signal, in particular by the application of an alternating voltage (FIG. 5, right). As can be seen, the overall electromagnetic field behavior for the two systems (left and right part of FIG. 5) is equivalent. As for the case of the multi-element sensor comprising three square-shaped blocks of FIG. 4 (right), the electromagnetic field shows some irregularities which may be due to discontinuities in the geometry of the inductor and to current singularities in the bends of the triangle-shaped coils of which the square-shaped single-element sensor is composed.

Figure 6:
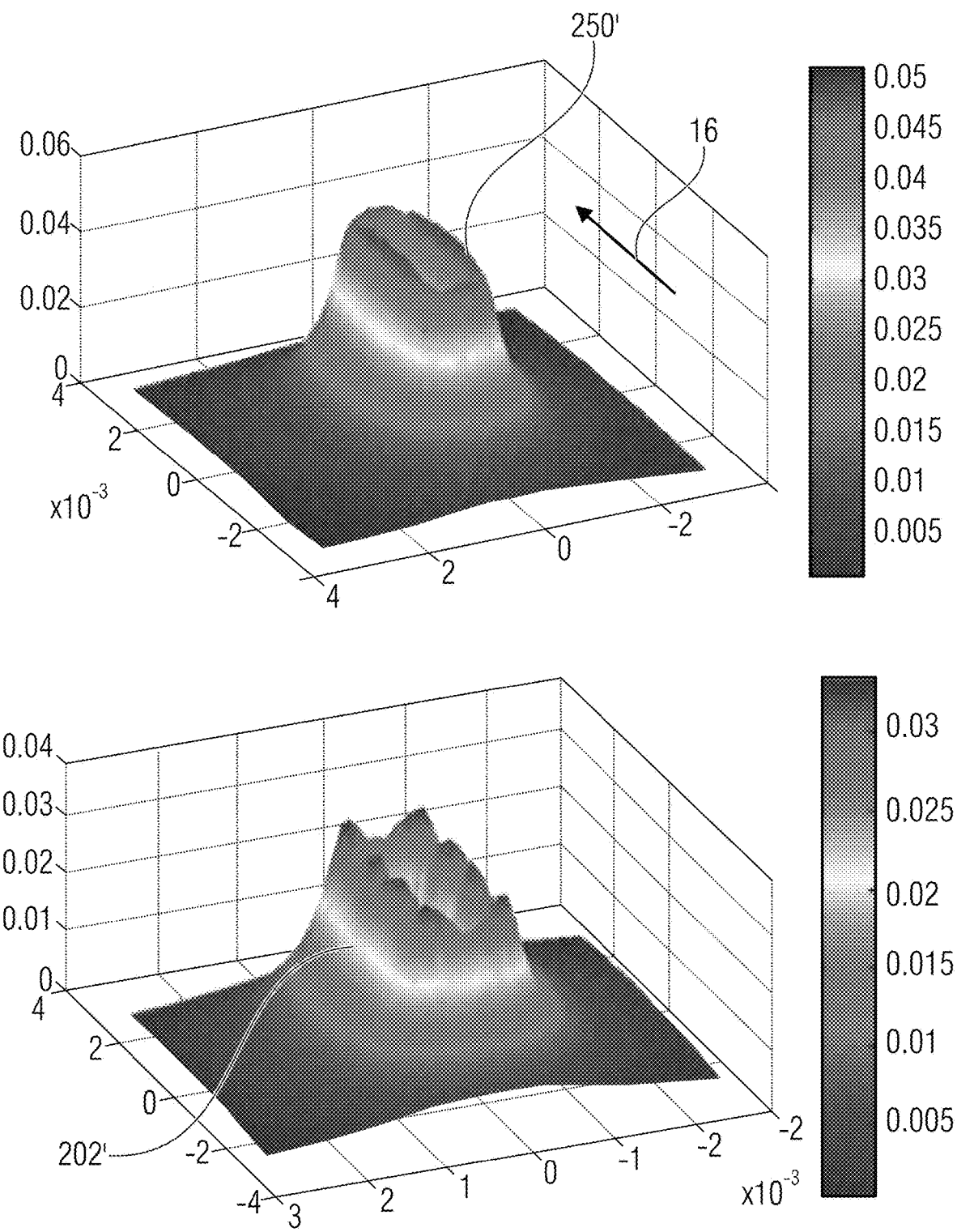
FIG. 6 shows a perspective view of the two-dimensional calculated distribution of the electric field magnitude at the front surface of the load (z=0), (a) for the rectangular coil of FIG. 5 (left), and, at the right, for the subgroup of the multi-element sensor, the sub-group being comprised of three adjacent eddy current sensor elements of FIG. 5 (right)

FIG. 6 shows the calculated electric field magnitudes for a single rectangular coil 250' (FIG. 6, upper part) in comparison to a sub-group 202' comprising three eddy current sensor elements (FIG. 6 lower part). In comparison to FIG. 5, the coil 250' as well as the sub-group 202' extends along a direction perpendicular to the direction of the arrow 15 indicated in FIG. 5. In particular, the coil 250' as well as the subgroup 202' extends a column, i. e. along the arrow 16 (FIG. 2).

Figure 7:
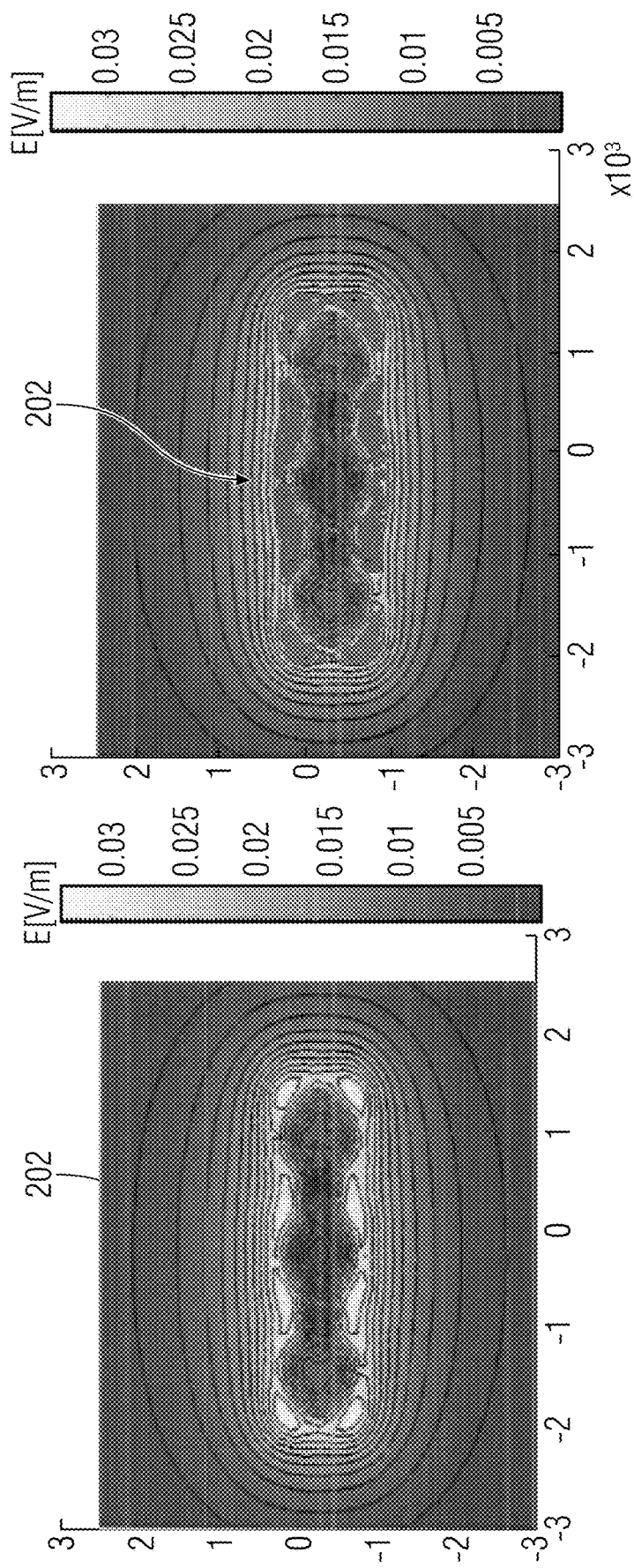
FIG. 7 shows a plan view of the distribution of the electric field magnitude for a sub-group comprising three eddy current sensor elements arranged in a row, at the front surface of the load (z=0), (left): without regard to nonexited elements (sigma=0), and (right): with non-excited elements being physically represented (sigma=30.6 $10^6$ S/m)

FIG. 7 shows the influence of coils adjacent to the sub-group 202 (FIG. 5) comprising the three square-shaped eddy current sensors elements 202a, 202b, 202c. The calculation of the distribution of the electric field magnitude surrounding the sub-group 202 was done by numerically neglecting the contribution of the adjacent, non-excited coils (left part) and by taking into account the effect of the adjacent, non-excited coils (right part).

As can be seen, the adjacent, non-excited coils and non-excited eddy current sensor elements, which are to be viewed 'at rest' with respect to the excited eddy current sensor element 202, do not have any significant effect on the spatial configuration of the resulting electromagnetic field or on its amplitude, in particular, when the eddy current sensor is operated at an operating frequency of approximately 1 MHz.

Figure 8:
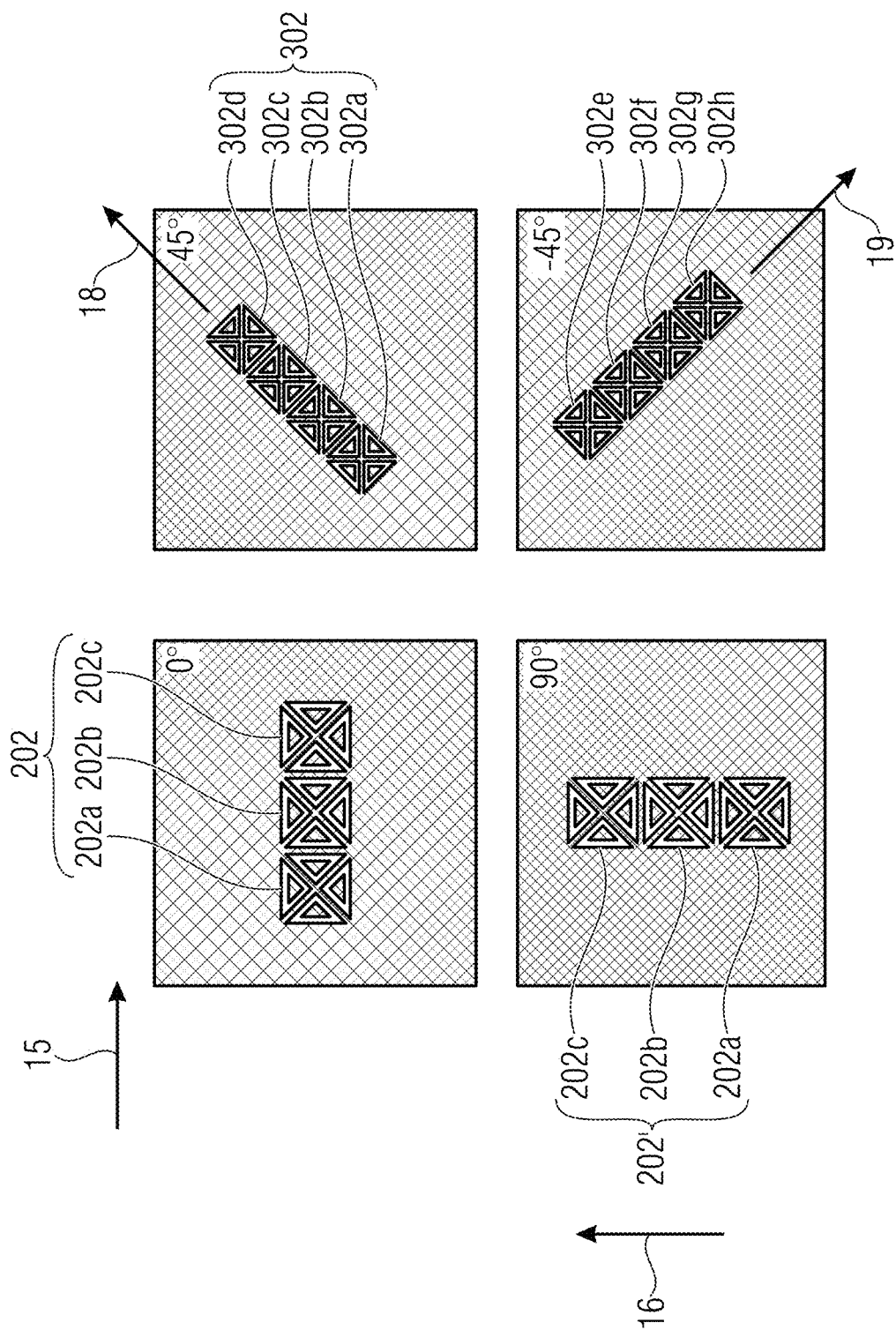
FIG. 8 shows a plan view of the eddy current sensor with four different field configurations generated by operating the multi-element eddy current sensor, the excited four different sub-groups of the multi-element eddy current sensor being a sensor equivalent to a rectangular coil oriented at 0°, 45°, 90° and 45°.

FIG. 8 shows four different sub-groups obtained by exciting four different sets of eddy current sensor elements of the eddy current multi-element sensor. The most fundamental unit is the coil 4 having the shape of a right-angles isosceles triangle which was described above with respect to FIG. 3. An arrangement 3 of four such coils 4, 5, 6, 7 forms a square-shaped eddy current sensor element 2 (FIG. 1a)

As can be seen in FIG. 8, left upper part, three eddy current sensor elements 202a, 202b, 202c arranged adjacent along a row, when excited simultaneously and jointly, result in a the sub-group 202 to be excited wherein the sub-group 202 has the effect of a single rectangular multi-element sensor which extends in a horizontal direction (at an angle of 0°, i. e. parallel to the direction of the arrow 15). Further, a different set of three eddy current sensor elements 202*d*, 202*b*, 202*e* can be excited by jointly and simultaneously applying a signal to each of them, in order to excite a sub-group 202' which is oriented in a vertical direction, i. e. in a direction along the arrow 16, wherein the sub-group 202' has the effect of a rectangular multi-element sensor which extends in the vertical direction (at an angle of 90° with respect to the arrow 15, FIG. 8, left lower part).

Furthermore, as was explained above with respect to FIG. 1*b*, two adjacent triangle-shaped coils 4, 14 can be simultaneously excited to give a square-shaped eddy current sensor element 102; such an eddy current sensor element 102 has an area which is smaller than the area of the eddy current sensor elements 2, 202*a, b, c, d, e*.

The square-shaped sensor element 302 comprising two triangular-shaped coils meeting at the respective parallel hypotenuse-edges is inclined at an angle of +1-45° with respect to the eddy current sensor elements 2, as can be seen in FIG. 8, right column. It can be seen that adjacent two coil eddy current sensor elements 302*a*, 302*b*, 302*c*, 302*d* are oriented along a first diagonal direction with respect to the vertical and horizontal direction. In particular, the four eddy current sensor elements 302*a*, 302*b*, 302*c*, 302*d* are arranged at an angle of 45° with respect to the horizontal direction. Furthermore, the two coil eddy current sensor elements 302*e*, 302*f*, 302*g*, 302*h* are arranged along another diagonal, at an angle of 90° with respect to the first diagonal and at an angle of –45° with respect to the horizontal direction.

Furthermore, it is envisaged excite a sub-group 302 by to simultaneously and jointly exciting the four two coil eddy current sensor elements 302*a,b,c,d* which are arranged in a line along the direction of the arrow 18. The excited sub-group 302 is inclined at an angle of 45° with respect to the horizontal direction (arrow 15). Additionally, it is envisaged to simultaneously and jointly a sub-group 302' by simultaneously and jointly exciting the four two coil eddy current sensor elements 302*e,f,g,h* such that the sub-group 302' is inclined at an angle of –45° with respect to the horizontal direction. Each of the sub-groups 302,302' corresponds to a rectangular effective sensor inclined at an angle of +–45° with respect to the horizontal direction.

As is apparent from FIG. 8, the triangular shape of the coils 4 (FIG. 3) allows for a great flexibility on desired shapes of an electromagnetic field. The eddy current sensor elements comprising two or four coils may be so arranged that they can give a large number of possible electromagnetic field configurations such that a mechanical swiveling, rotation or shifting of the sensor can be avoided. Furthermore, the assembly can cover a relative wide inspection area which may reduce the number of scanning operations.

For different modes of excitation, the eddy current sensor 1 made up of triangle-shaped coils (FIG. 2) can be operated such that sub-groups of the coils, wherein a sub-group comprises at least to adjacent eddy current sensor units, can have the electromagnetic field configuration of a single rectangular coil oriented at 0°, 45°, 90° and –45° without recurring to mechanical rotation. This property can be exploited and applied to the measurement of a laminate made of plies of CFRP.

The modeled system of the laminate made of the plies of CRFP is a stack of four plies oriented at (0°, 45°, 90°,)–45°. The physical and geometrical characteristics of the modeled system are given by the following table:

| Parameter | Numerical values | Unit |
|---|---|---|
| Laminate | | |
| Number of plies | 4 | |
| Fibres orientation | 0°, 45°, 90° et –45° | [deg] |
| Conductivity ($\sigma_0, \sigma_\perp, \sigma_m$) | (1.104, 2.102, 10) | [S/m] |
| Ply thickness | 125 | [µm] |
| Sensor | | |
| Number of coils | 36 | |
| Gap inter-coils | 0.08 | [mm] |
| Lift-off | 0.125 | [mm] |
| Current intensity | 20 | [mA] |
| Frequency | 1 | [MHz] |

Figure 9:
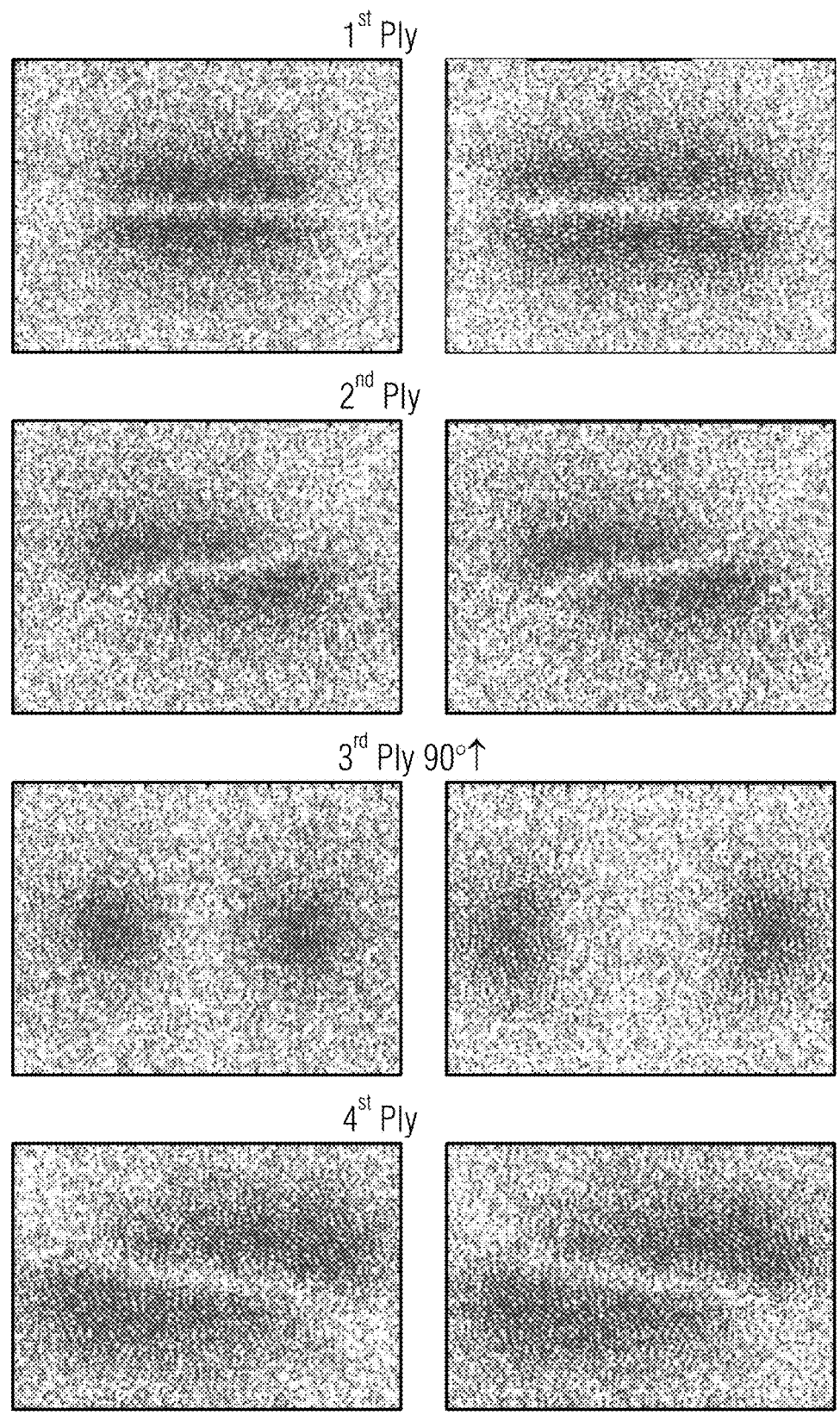
FIG. 9 shows a plan view of the eddy current distribution in different plies of a laminate (0°, 45°, 90°, −45°), at the right column caused by sub-groups of a multi-element sensor, and at the left column caused by a single rectangular coil (3.2 mm×1 mm)

FIG. 9 illustrates the calculated distribution of eddy currents induced on a laminate substrate with the above characteristics, by a single rectangular sensor (serving as an inductor) oriented at 0° and its equivalent sub-group 202 comprising the three adjoining eddy current sensor elements 202*a, b, c* (FIG. 8, right upper part). The sensor (serving as an inductor) has essentially the same outer contour as the sub-group 202. Such a sensor is depicted in the left part of FIG. 5 and indicated there with the reference numeral '250'.

It can be noted that the distribution of the induced eddy currents by the two types of sensor in each ply of the laminate is quite identical. This leads to expect an identical response in terms of impedance. Furthermore, the results presented in FIG. 10 prove that the proposed multi-element sensor given by the sub-group 202 (as depicted in FIG. 8, left upper part) may detect the orientation of the plies as well as their order of stacking.

Figure 10:
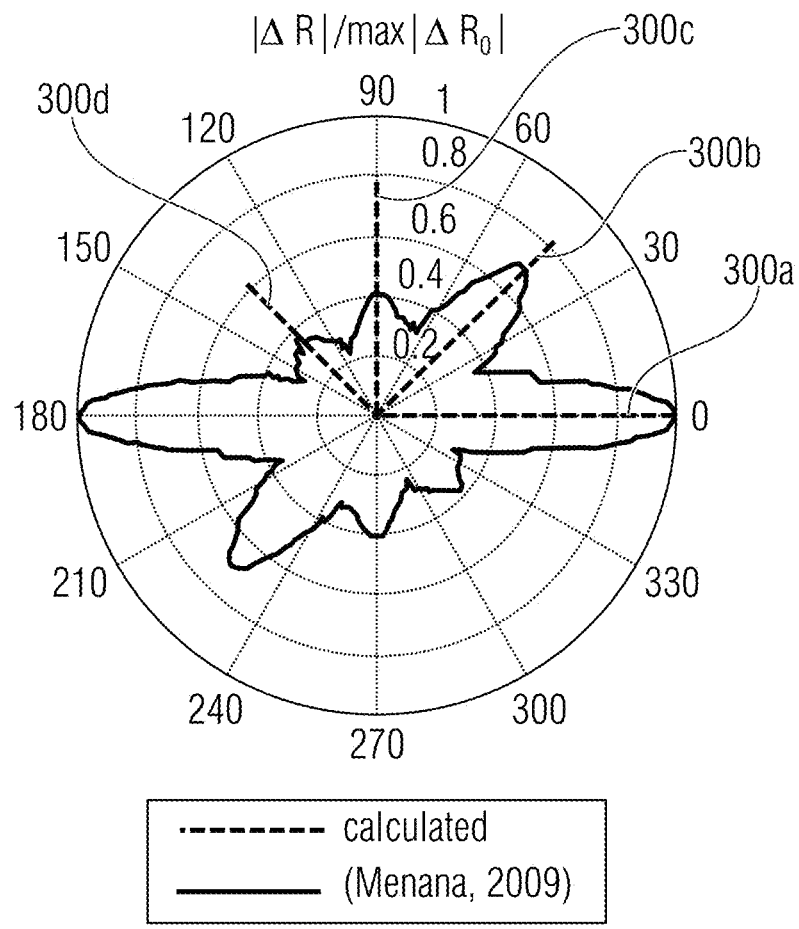
FIG. 10 shows a diagram showing the normalized resistance of the coil as a function of its rotation angle above a laminate of four plies)(0°/45°/90°/−45°.

The polar diagram of FIG. 10 gives the intensity of the measured signal in terms of the rotation angle of the sub-group 202 serving as sensor sensing the response of the induced eddy currents as a change in impedance. The four angles of the obtained lobes 300*a, b, c, d* determine the different fibers orientations whereas their amplitude indicates the position of the ply in the sample under study. The comparison between the amplitudes of the peaks of the lobes 300*a,b,c,d* shows that they are decreasing according to the stacking order of the plies. However, some mismatch as concerns the number of turns and the dimensions of the coils has to be taken into account when comparing the as-obtained results of FIG. 10 with similar results taken from the literature (e. g. Menana H. (2009): Non-destructive evaluation of the conductivity tensor of a CFRP plate using a rotating eddy current sensor, XIV International Symposium on Electromagnetic Fields. ISEF 2009, Arras-France). It is further noted that there is no significant difference between the peaks at 45° and at 90°; this observation could be explained by the change of sizes of the equivalent rectangular-shaped sub-groups of coils, oriented at 45° and at 90° (see FIG. 8): In particular, the sub-group 302 (FIG. 8, right upper part) has a slightly higher effective measuring area as compared to the sub-group 202' (FIG. 8, left lower part).

Referring to FIG. 2, the described embodiment of an eddy current sensor can be envisaged to be a rectangular, in particular square shaped array of identical coils. In particular, the described embodiment of the eddy current sensor can be envisaged as a single assembly comprising 36 congruent coils, each of which having the shape of a right-angled isosceles triangle such that an angle between one of the sides (sceles) and the hypotenuse (the base) of the triangle is 45°. Since the coils are to be regarded as identical as regards the geometrical as well as to the electrical parameters, in order to determine the best configuration for the optimal functioning of the eddy current sensor, a typical, randomly selected, triangle-shaped coil 4 (FIG. 3) is characterized and modelled with respect to its geometrical, electrical and physical characteristics.

For a geometrical characterization of the triangular shaped coils, the developed or the total length of the wire $l_{total}$ and the total effective surface $S_{total}$ are given by the equations 1 and 2 respectively:

$$l_{total} \approx n\left[(2+\sqrt{2})D - (n-1)(l_p + E_p)\left(1 + \frac{2}{\tan(\pi/8)}\right)\right] \quad (1)$$

$$S_{total} \approx \frac{1}{2}\sum_{k=1}^{n}\left[D - (k-1)(l_{p+}E_p)\left(1 + \frac{1}{\tan(\pi/8)}\right)\right] \quad (2)$$

where D is the external rib of the coil, Ip is the line width, Ep is the inter-lines distance and n is the number of turns (FIG. 3).

For an electrical characterization of the triangular-shaped coil, reference is made to FIG. 11 as an electrical model of the coil, in particular as an equivalent circuit diagram of the coil, such that the resistance R, the capacitance C and the inductivity L are given by the equations 3 to 5 as below:

$$R = \frac{\rho \cdot l_{total}}{l_p \cdot h_p} \quad (3)$$

$$c = \left[\sum_{k=2}^{n}\left(\frac{1}{\varepsilon} \cdot \frac{h_p \cdot l_k}{E_p}\right)\right]^{-1} \quad (4)$$

$$L = \frac{\omega}{I^2}\int\int\int_\Omega \frac{1}{\mu}|\vec{B}|^2 d\Omega \quad (5)$$

Where $h_p$ is the height of the line, ρ is its electrical resistivity, ε is the electric permittivity, ω is the angular frequency, Ω is the study domain, μ is the magnetic permeability and B is the magnetic flux density. For a determination of the coil inductance L, a census of the stored magnetic energy (equ. 5) was provided via the FE (finite elements) model developed and described below, with reference to equ. (9), (10), below.

For a physical characterization of the coil, the electromagnetic behavior needs to be qualified. As an electromagnetic sensor, acting as an emitter, the emissive ability has to be calculated. If the coil is used as a receiver, its sensitivity and its electrical noise signal have to be determined. The proposed triangular-shaped coil has the versatility to work in emission and reception simultaneously or separately. As a consequence, the eddy current sensor element comprising two or four coils as well as a sub-group formed by exciting at least two adjacent eddy current sensor elements has also the versatility to work in emission and reception simultaneously or separately.

The sensitivity S of a coil at a frequency f is according to Faraday-Lenz's law given by equation 6:

$$S = \left|\frac{dV}{dB}\right| = 2\pi f S_{total} \quad (6)$$

where dV is the voltage variation provoked by a variation in the received magnetic induction dB.

The noise $v_b$ of a coil when it is not carrying current is only a thermal agitation noise. This effective voltage at a temperature T and in a measuring frequency range Δf is given by equation 7:

$$v_b = \sqrt{4k \cdot T \cdot R \cdot \Delta f} \quad (7)$$

(K: Boltzmann constant).

The emissive ability $P_e$ is the ratio between the emitted field 'B' and the current 'I' needed for its emission, according to equation 8:

$$P_e = \frac{B}{I} = \frac{L}{S_{total}} \quad (8)$$

The relationship between the geometrical, electrical and physical characteristics given above allows to study the influence of each parameter and thus to determine the optimum dimensions of a coil appropriate for a specific application.

The following table provides the characteristics of the selected triangular-shaped coil that was used to non-destructively evaluate the CFRP:

| | Parameter | Numerical value | Unit |
| --- | --- | --- | --- |
| Coil dimensions | external length D | 1 | [mm] |
| | line width lp | 6 | [μm] |
| | inter-line space Ep | 3 | [μm] |
| | number of turns n | 33 | |
| Electrical parameters | resistance R | 4.24 | [ohm] |
| | inductance L | 1.44 | [μH] |
| | capacity C | 3.5 | [fF] |
| | sensitivity S | 35 | [V/T] |
| | noise voltage $v_B$ | 0.83 | [μV] |
| | emissive ability $P_r$ | 254 | [mT/A] |

Figure 11:
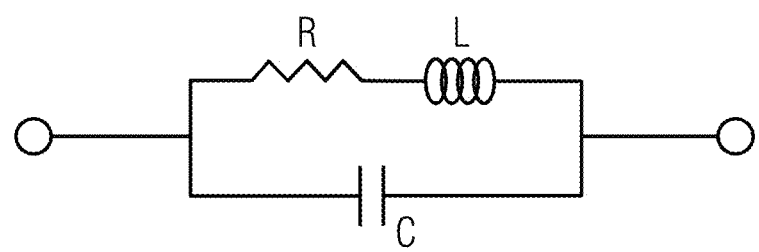
FIG. 11 shows an equivalent circuit diagram as a schematic electrical model of a coil in general.
Figure 12:
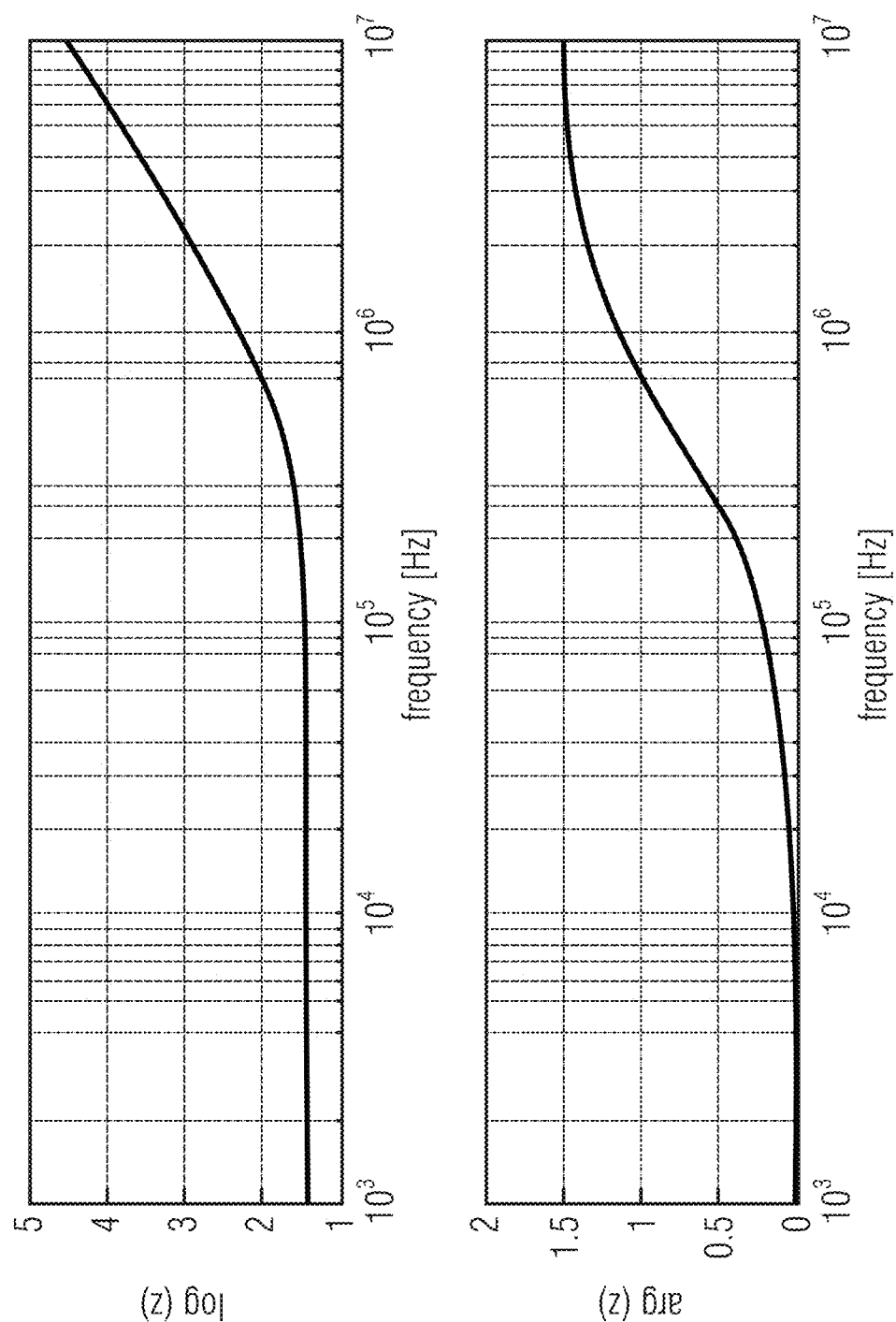
FIG. 12 shows two diagrams with the calculated frequency response of a coil (FIG. 3) from which the eddy current sensor is made up.

Based on the theoretical model as depicted in the equivalent circuit diagram of FIG. 11 for a coil in general, FIG. 12 shows the frequency response of a triangular shaped coil with the parameters of the table given above. It can be seen that the triangular shaped coil can be used as an electromagnetic field sensor up 800 kHz where it shows a strong inductive behavior with a phase upper to 60°. The cut off frequency is much greater than 100 MHz.

After the construction of the geometry of the triangular shaped coil and a mesh generation for model the sensor array using the open-source software GMSH, the data were sent to a 3D finite element solver in which were implemented the magneto-dynamics formulation AV-A (equ. 9, below, retained as a governing equation), this mathematical model was retained to describe the electromagnetic behavior of the array of the triangular shaped sensor coils. The calculations were carried out in the harmonic regime. A penalty term was introduced to ensure the uniqueness of the solution (Helifa et al. (2012), Contribution à la simulation du CND par courants de Foucault en vue de la caractérisation des fissures débouchantes. Thèse en sciences et technologies de l'information et de mathématiques, Université de Nantes).

$$\begin{cases} \vec{\nabla} \times \frac{1}{\mu}\vec{\nabla} \times \vec{A} - \vec{\nabla}\left(\frac{1}{\mu}\vec{\nabla}\cdot\vec{A}\right) + \overline{\sigma}(j\omega\vec{A} + \vec{\nabla}V) = \vec{J} \\ \vec{\nabla}\cdot(j\omega\overline{\sigma}(\vec{A} + \vec{\nabla}V)) = 0 \end{cases} \quad (9)$$

$\vec{A}$ and V are respectively the magnetic vector potential and electric scalar potential, μ is the magnetic permeability and $\sigma$ is the electrical conductivity tensor given according to the ply orientation by Menana (2009), equation 10:

$$\overline{\overline{\sigma}} = \begin{pmatrix} \sigma_{\parallel}\cos^2(\theta) + \sigma_{\perp}\sin^2(\theta) & \frac{\sigma_{\parallel} - \sigma_{\perp}}{2}\sin(2\theta) & 0 \\ \frac{\sigma_{\parallel} - \sigma_{\perp}}{2}\sin(2\theta) & \sigma_{\parallel}\cos^2(\theta) + \sigma_{\perp}\sin^2(\theta) & 0 \\ 0 & 0 & \sigma_{zz} \end{pmatrix} \quad (10)$$

where $\sigma_{\parallel}$ is the electrical conductivity in the fibres direction, $\sigma_{\perp}$ is the conductivity in the transverse direction of the fibres and $\sigma_{zz}$ is the conductivity in the direction of the plies stacking. The tensor according to equ. (10) represents the anisotropy character of the laminate CFRP model system.

Using the characteristics of the selected coil according to the table above and using the model outlined above, in particular with the equations 9 and 10, the results depicted in FIGS. 5, 6 7 and 8 were calculated. Furthermore, using the characteristics of the modeled system (stack of four plies, see table above), the results depicted in FIGS. 9 and 10 were numerically obtained. The sensor response, calculated using 3D finite element (FE) modeling, shows the ability of the sensor in particular to evaluate the orientations of plies in CFRP and the order of their stacking. The as-described eddy current sensor, dedicated to non-destructive testing using eddy currents, is an alternative to conventional eddy current sensors which need a mechanical rotation of the sensor in order to evaluate the orientation of plies in CFRP.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

Grimberg, R. (2005): Eddy current examination of carbon fibres in carbon epoxy composites and Kevlar, The 8$^{th}$ International Conference of the Slovenian Society for Non-Destructive Testing, September 1-3, Portoroz, Slovenia, Helifa B. (2012): Contribution à la simulation du CND par courants de Foucault en vue de la caractérisation des fissures débouchantes. Thèse en sciences et technologies de l'information et de mathématiques, Université de Nantes.

Menana H. (2009): Non destructive evaluation of the conductivity tensor of CFRP plate using a rotating eddy current sensor, XIV International Symposium on Electromagnetic Fields. ISEF 2009, Arras-France Mook G. (2001): Non-destructive characterization of carbon-fiber reinforced plastics by means of eddy currents. Composites Science and Technology no. 61, p. 865-873

Ravat C. (2008): Conception de multicapteurs a courants de Foucault et inversion des signaux associés pour le contrôle non destructive. Thése en sciences et technologies de l'information des télécommunications et des systèmes. Université Paris-Sud II.

Savin A. (2000): Evaluation of delamination in Carbon Fiber Composites Using the Eddy Current Method. 15$^{th}$ WCNDT, Roma 2000.

The invention claimed is:

1. An eddy current sensor element for non-destructive testing of a substrate, comprising:
    an assembly of at least a first and a second flat coil,
    wherein the first flat coil and the second flat coil each comprise a triangular shape with a first to third coil edge, wherein one of the edges of the first flat coil and one of the edges of the second flat coil are arranged adjacent and parallel to each other, and
    wherein the assembly comprises a square shape, wherein a control unit is configured to apply a signal to the coils of the eddy current sensor elements such that for each of the current sensor elements, a current in an antiparallel direction is provided, wherein the control unit is further configured to shift at least one sub-group in at least two directions.

2. The eddy current sensor element according to claim 1, wherein each of the coils comprises the shape of an isosceles triangle.

3. The eddy current sensor element according to claim 1, wherein each of the coils comprises the shape of a right-angled triangle.

4. The eddy current sensor element according to claim 3, wherein the two flat coils are arranged such that the hypotenuse-edges of the first coil and of the second coil are parallel.

5. The eddy current sensor element according to claim 1, wherein the assembly comprises two flat coils.

6. The eddy current sensor element according to claim 1, wherein the assembly comprises four flat coils such that for any one of the coils, a first edge of this coil is parallel to an edge of a first adjacent coil, and a second edge of this coil is parallel to an edge of a second adjacent coil.

7. The eddy current sensor element according to claim 1, wherein the triangular shaped flat coils of the assembly are formed for an operating frequency of 0.8 to 2 MHz, in particular of approximately 1 MHz.

8. The eddy current sensor element according to claim 1, wherein all of the flat coils of the assembly are congruent to each other.

9. A method for operating an eddy current sensor element according to claim 1, comprising:
    (a) exciting the eddy current sensor element by simultaneously applying a signal to each of the first and the second coil, such that the edge of the first flat coil and the edge of the second flat coil being arranged adjacent and parallel to each other are traversed by currents in antiparallel directions.

10. The method according to claim 9, further comprising:
    (b) sensing the response of the excited substrate by detecting a change in impedance in the flat coils of the eddy current sensor element.

11. The eddy current sensor according to claim 9, wherein the control unit is configured such that adjacent inner edges of the flat coils of the sub-group are provided with currents in antiparallel directions.

12. The eddy current sensor according to claim 9, wherein the control unit is configured such that the collective outer edge of the flat coils of a sub-group is provided with a current in a collective circumferential direction.

13. The eddy current sensor according to claim 9, wherein the control unit is further configured to sense the response of the substrate by detecting a change in impedance of the coils to which the signal has been applied.

14. A method for operating an eddy current sensor, comprising:

(a) providing an eddy current sensor according to claim 9, and performing the steps (b) and (c) for a first eddy current sensor element and subsequently for a second eddy current sensor element:

(b) exciting the eddy current sensor elements by simultaneously applying a signal to each of the first and the second coil, such that the current traversing the inner edge of the first coil is antiparallel the current traversing the inner edge of the second coil, and (c) sensing the response of the excited substrate by detecting a change in impedance of the coils of the respective excited current sensor element, wherein two adjacent portions of a surface are scanned without a relative movement of the eddy current sensor with respect to the surface under study.

15. The method according to claim 14, wherein the second eddy current sensor element is arranged adjacent to the first eddy current sensor element.

16. An eddy current sensor for non-destructive testing of a substrate, comprising a plurality of the eddy current sensor elements according to claim 1, wherein the eddy current sensor elements are arranged, in a quadrangular order, adjacent and parallel to each other, such that any two adjacent sensor elements comprise two parallel edges, further comprising a control unit which is configured to simultaneously apply a signal to the coils of a sub-group of the coils, wherein the sub-group comprises at least one of the eddy current sensor elements, wherein the control unit is further configured to subsequently apply a signal to a first sub-group and to a second sub-group, wherein the two sub-groups are extending along different directions, wherein the control unit is configured to shift the sub-group in at least two directions by simultaneously and jointly exciting the eddy current elements to gain the effective sensor and then to simultaneously and jointly excite the eddy current elements in order to provide a shift along one of the directions.

17. The eddy current sensor according to claim 16, wherein the eddy current sensor elements form an array of columns and rows.

18. A method for operating an eddy current sensor, comprising:

(a) providing an eddy current sensor according to claim 16, (b) exciting the eddy current sensor by simultaneously and jointly exciting each of the at least two eddy current sensor elements, with the second eddy current sensor element being adjacent to the first eddy current sensor element, by simultaneously applying a signal to each of the first and the second coil of each of the eddy current sensor elements causing the current traversing an outer edge of the first eddy current sensor element to be antiparallel to a current traversing an outer edge of a second eddy current sensor element adjacent to the first eddy current sensor element, wherein two adjacent portions of a surface are scanned without a relative movement of the eddy current sensor with respect to the surface under study.

19. The method according to claim 18, further comprising: sensing the response of the excited substrate by detecting a change in impedance of the eddy current sensor elements.

* * * * *